US006248430B1

(12) United States Patent
Toyoda et al.

(10) Patent No.: US 6,248,430 B1
(45) Date of Patent: Jun. 19, 2001

(54) LACTIC ACID-BASED POLYMER LAMINATED PRODUCT AND MOLDED PRODUCT

(75) Inventors: Akio Toyoda; Kousuke Arai, both of Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/371,778

(22) Filed: Aug. 10, 1999

(30) Foreign Application Priority Data

Aug. 11, 1998 (JP) .................................................. 10-226915

(51) Int. Cl.[7] .............................. B32B 7/00; B32B 27/08; B32B 27/36
(52) U.S. Cl. ........................... 428/213; 428/212; 428/480; 528/271; 528/301; 528/302; 528/354; 528/361
(58) Field of Search ..................................... 428/212, 213, 428/35.7, 36.9, 480; 528/271, 301, 302, 354, 361

(56) References Cited

U.S. PATENT DOCUMENTS 5,091,262 * 2/1992 Knott et al. ............................ 428/516
5,108,807 * 4/1992 Tucker ................................. 428/35.2
5,470,526 * 11/1995 Wilfong et al. ...................... 428/36.6

FOREIGN PATENT DOCUMENTS

WO 90/01521 * 2/1990 (WO) .

* cited by examiner

Primary Examiner—Vivian Chen
(74) Attorney, Agent, or Firm—Armstrong, Westerman, Hattori, McLeland & Naughton LLP

(57) ABSTRACT

The present invention provides a lactic acid-based polymer laminated product which is little liable to leakage of lactide during molding or storage of the molded product and can degrade at a raised rate and a molded product made of such a laminated product. Disclosed are a novel lactic acid-based polymer laminated product comprising a degradation accelerator barrier layer (II) made of a lactic acid-based polymer (B) having a lactide content of not more than 0.1% by weight laminated on one or both surfaces of a base layer (I) made of a lactic acid-based polymer (A) comprising a degradation accelerator made of lactide and/or organic acid in an amount of from 0.3 to 7% by weight, wherein the ratio of the barrier layer thickness to the base layer thickness is from 0.02 to 1 based on that of the base layer, and a molded product of the laminated product.

12 Claims, No Drawings

LACTIC ACID-BASED POLYMER LAMINATED PRODUCT AND MOLDED PRODUCT

FIELD OF THE INVENTION

The present invention relates to a laminated product of a lactic acid-based polymer having an accelerated or controlled biodegradability which can be used as film or sheet for agricultural or civil engineering purposes or can be used to package or house various foods, beverages, chemicals, miscellaneous goods, etc. and a molded product made of such a laminated product, particularly in the form of film, sheet, packaging bag or lightweight vessel obtained by thermoforming these films or sheets, injection-molded vessel, blow-molded vessel, etc.

BACKGROUND OF THE INVENTION

Because of its excellent characteristics such as high water resistance, high transparency, high strength, good thermoformability and low cost, a molded product of thermoplastic plastic has been heretofore in an enormous amount for many purposes such as agricultural film for heat-retaining, moisture-retaining crops during growth or protecting crops against external factors such as rain and wind, civil engineering sheet for preventing the flow of earth and sand, film and sheet which acts as a packaging material for various foods, beverages, chemicals, miscellaneous goods, etc., packaging bag or lightweight vessel obtained by thermoforming film or sheet, injection-molded vessel and blow-molded vessel.

Examples of thermoplastics which have heretofore been normally used as general-purpose resins include polyethylene, polypropylene, polystyrene, and polyvinyl chloride. After used, these plastic wastes are disposed of by incineration or reclamation. However, these disposal methods are disadvantageous in that they overflow the land to be reclaimed, mar the scene, threaten oceanic life, pollute the environment or cause other global environmental problems.

In particular, when resins such as polyethylene, polypropylene and polystyrene are incinerated, these resins give a high combustion calorie that can damage the furnace and thus shorten the life thereof. On the other hand, when a polyvinyl chloride is incinerated, it gives a low combustion calorie but produces harmful gases. Referring to reclamation, it is known that these general-purpose resins have a high chemical resistance and thus semipermanently remain undegraded and intact, partly causing the shortage of land to be reclaimed.

Further, when these thermoplastic plastics are discarded in the natural environment, they mar the appearance of the nature or can be accidentally ate by marine life, birds, etc. to cause the loss of rare living resources, partly causing the environmental destruction. In order to solve these social problems, biodegradable polymers are now under extensive study.

For example, as a multi-film for the purpose of keeping heat and humidity to help the growth of crops or agricultural film or sheet such as green house sheet for protecting crops against severe external factors there has heretofore been used a polyolefin resin such as polyvinyl chloride, polyethylene and polypropylene. After used, these films or sheets are freed of soil accumulated, collected and then discarded.

This work requires much labor. Further, these waste films or sheets are partly incinerated. However, they are mostly stored or incinerated outdoor. Thus, they can be easily ate by birds. Further, when incinerated they discharge hydrogen chloride gas to the atmosphere, accelerating the environmental pollution.

If these films or sheets can be prepared from a biodegradable polymer so that they can degrade and disappear in soil rapidly after used, the time and required to remove them can be eliminated, and the burden on the environment can be lessened.

This applies to civil engineering sheets. At present, polyvinyl chloride sheets are mostly used. If these sheets can withstand working conditions during use but can rapidly degrade and disappear after used, the time and labor required to remove them can be eliminated, and the burden on the environment can be lessened.

This also applies to packaging materials for various liquids, powders and solid matters such as food, beverage, chemical and miscellaneous goods. It has been expected to replace the conventional polymer by a biodegradable polymer which can readily degrade after used to lessen the burden on the environment.

One of these biodegradable polymers which are noted is polylactic acid called lactic acid-based polymer or its copolymer. A lactic acid-based polymer is one of thermoplastic resins. It has characteristics similar to that of general-purpose resins with respect to water resistance, transparency, strength and thermoformability. In addition, it has characteristics which are not possessed by the general-purpose resins. In other words, a lactic acid-based polymer undergoes hydrolysis reaction and complete decomposition by microorganisms, eventually resulting in the decomposition to water and carbon dioxide Further, since a lactic acid-based polymer has a small combustion calorie, it neither damages the furnace nor produces harmful gases when incinerated. Moreover, as the fermentation starting materials of lactic acid there can be used plant resources, giving various excellent advantages such as reduction of dependence on petroleum resources, which are limited in occurrence.

Molded products of such a biodegradable lactic acid-based polymer need to maintain their desired shape and physical properties during their commercial distribution and use but preferably degrade readily after used. Accordingly, it is preferred that the rate of biodegradation of the lactic acid-based polymer should be controlled as much as possible depending on the purpose of the molded product. A published Japanese translation of PCT international publication for patent application No. 4-504731 discloses that lactide or oligomer incorporated in a polylactic acid as a plasticizer accelerates the deterioration of the polylactic acid.

Thus, it can be proposed to increase the content of lactide in the polylactic acid in order to enhance the degradation rate of polylactic acid. However, if lactide is incorporated in a polylactic acid, it is sublimed during thermoforming (extrusion film-forming, extrusion molding or injection molding) to adhere to or deposit on the molding apparatus such as chill roll and cooling mold. Therefore, the resulting deposit mark of lactide is then transferred to the molded product, remarkably marring the quality thereof. At the same time, the incorporation of lactide makes it difficult to form the polylactic acid. Moreover, lactide can leak front the molded product during storage, causing fatal stain on the molded product, particularly in film or sheet form. Such stain not only mar the external appearance of the molded product but also attracts dust to contaminate merchandises contained therein as well.

SUMMARY OF THE INVENTION

It is therefore an object of the present invention to provide a lactic acid-based polymer laminated product which is little liable to leakage of lactide during molding or storage of the molded product and can degrade at a raised rate and a molded product made of such a laminated product.

The foregoing object of the present invention will become apparent from the following detailed description and examples.

As a result of extensive studies, the inventors found that the use of a lactic acid-based polymer laminated product comprising a base layer (I) made of a lactic acid-based polymer (A) comprising a degradation accelerator made of lactide and/or organic acid and a degradation accelerator barrier layer (II) made of a lactic acid-based polymer (B) having a lactide content of not more than 0.1% by weight for the purpose of preventing the leakage of the degradation accelerator during molding makes it possible to obtain a lactic acid-based polymer laminated product which is little liable to leakage of a degradation accelerator such as lactide during molding or storage of the molded product and can decompose at a raised rate and a molded product made of such a laminated product. The present invention has thus been worked out.

The present invention has the following constitutions:

(1) A lactic acid-based polymer laminated product comprising a degradation accelerator barrier layer (II) made of a lactic acid-based polymer (B) having a lactide content of not more than 0.1% by weight laminated on one or both surfaces of a base layer (I) made of a lactic acid-based polymer (A) comprising a degradation accelerator made of lactide and/or organic acid in an amount of from 0.3 to 7% by weight to a thickness ratio of from 0.02 to 1 based on that of said base layer.

(2) The lactic acid-based polymer laminated product according to Clause (1), wherein said lactic acid-based polymer (A) and/or lactic acid-based polymer (B) comprises a polyester structural unit obtained by the dehydrocondensation of dicarboxylic acid with diol and/or a polyether structural unit obtained by the dehydrocondensation of dicarboxylic acid with a polyether polyol in an amount of from 3 to 60% by weight.

(3) The lactic acid-based polymer laminated product according to Clause (1), wherein said lactic acid-based polymer (A) and/or lactic acid-based polymer (B) is a polylactic acid.

(4) The lactic acid-based polymer laminated product according to any one of Clauses (1) to (3), wherein said lactic acid-based polymer (B) comprises a lactic acid-based polymer containing a polymerization catalyst which has been deactivated with a polymerization catalyst deactivator after polymerization and/or the residual monomer content of which has been reduced by volatilization and/or reprecipitation.

(5) The lactic acid-based polymer laminated product according to any one of Clauses (1) to (3), wherein said lactic acid-based polymer (A) is one obtained by incorporating a degradation accelerator made of lactide and/or organic acid in a lactic acid-based polymer during its molding.

(6) A molded product of a lactic acid-based polymer laminated product according to any one of Clauses (1) to (5).

(7) The molded product according to Clause (6), which is in the form of film or sheet.

(8) The molded product according to Clause (6), obtained by injection molding or blow molding.

DETAILED DESCRIPTION OF THE INVENTION

The present invention concerns a lactic acid-based polymer laminated product comprising a base layer (I) made of a lactic acid-based polymer (A) comprising a degradation accelerator made of lactide and/or organic acid in an amount of from 0. 3 to 7% by weight and a degradation accelerator barrier layer (II) made of a lactic acid-based polymer (B) having a lactide content of not more than 0.1% by weight for preventing the precipitation of a degradation accelerator from said base layer laminated on one or both surfaces of said base layer (I) and a molded product made of such a laminated product, particularly in the form of film, sheet, packaging bag or lightweight vessel obtained by thermoforming these films or sheets, injection-molded vessel, blow-molded vessel, etc.

The lactic acid-based polymer (A) to be incorporated in the base layer (I) constituting the lactic acid-based polymer laminated product of the present invention is adapted to accelerate or control the degradation of the lactic acid-based polymer laminated product. It comprises a lactic acid-based polymer having a degradation accelerator incorporated therein in an amount of from 0.3 to 7% by weight. If the content of the degradation accelerator in the lactic acid-based polymer (A) falls below 0.3% by weight, the degradation of the lactic acid-based polymer laminated product cannot be sufficiently accelerated. On the contrary, if the content of the degradation accelerator in the lactic acid-based polymer (A) exceeds 7% by weight, the resulting base layer shows a big difference in thermal fluidity from the barrier layer (II) made of lactic acid-based polymer (B), remarkably marring the external appearance of the lactic acid-based polymer laminated product during thermoforming accompanied by thermal fluidity.

The lactic acid-based polymer (B) to be incorporated in the barrier layer (II) for preventing the leakage of the degradation accelerator from the base layer (I) comprising the lactic: acid-based polymer (A) preferably comprises lactide incorporated therein in an amount of not more than 0.1% by weight to prevent the leakage of the degradation accelerator during the thermoforming of the lactic acid-based polymer laminated product. The ratio of the thickness of the barrier layer is preferably from 0.02 to 1, more preferably from 0.03 to 0.7 based on that of the base layer (I) comprising the lactic acid-based polymer (A).

The lactic acid-based polymer (A) and/or lactic acid-based polymer (B) comprises a structural unit obtained by the dehydrocondensation of polylactic acid or a structural unit obtained by the dehydrocondensation of lactic acid and a polyester structural unit obtained by the dehydrocondensation of dicarboxylic acid with diol and/or a polyether structural unit obtained by the dehydrocondensation of dicarboxylic acid with polyether polyol in an amount of from 3 to 60% by weight. The weight-average molecular weight of these lactic acid-based polymers is preferably from 10,000 to 500,000.

The polymer to be used in the present invention is a lactic acid-based polymer comprising a polyester made of polylactic acid component, lactic acid component, dicarboxylic acid component, diol component and/or polyether polyol component or a mixture thereof. Examples of the lactic acid component include L-lactic acid, D-lactic acid and DL-lactic acid, which are optical isomers, and L-lactide, 0-lactide and DL-lactide, prepared by cyclic dimerization of these lactic acids.

All these lactic acid components can be used in the present invention. In practice, however, L-lactide and D-lactide are preferably used in admixture such that the mixing ratio thereof is from 100/0 to 90/10, more preferably from 95/5 to 99/1 from the standpoint of crystallinity of the resulting lactic acid-based polymer.

As the dicarboxylic acid component there may be used an aliphatic dicarboxylic acid and/or aromatic dicarboxylic acid known as an ordinary polyester component. Preferred examples of these dicarboxylic acids are those having a methylene chain length of from 2 to 10. Examples of these dicarboxylic acids include adipic acid, sebacic acid, and succinic acid. As the diol component there may be used an aliphatic and/or aromatic dial known as an ordinary polyester component. Preferred examples of these diols are those having from 2 to 6 carbon atoms in the main chain. Examples of these diols include ethylene glycol, propylene glycol, butylene glycol, 1,4-butanediol, and 1,6-hexanediol.

Examples of the polyether polyol to be used herein include polyethylene glycol, polypropylene glycol, and polybutylene glycol. Particularly preferred among dicarboxylic acid components are adipic acid, sebacic acid, and dimeric acid. Particularly preferred among these diol components is propylene glycol. Particularly preferred among these polyether polyols is polypropylene glycol.

As the process for the preparation of the polylactic acid there may be used a process which comprises synthesizing lactide as a cyclic dimer from lactic acid, and then subjecting the lactide to ring opening polymerization to obtain a high-molecular weight polylactic acid. Alternatively, a process may be used which comprises subjecting lactic acid to direct dehydrocondensation to synthesize a polylactic acid. The copolymer as lactic acid-based polymer can be obtained by adding one or more copolymer components such as an aliphatic polyester, an aromatic polyester, caprolactone, vinyl acetate, ethylene terephthalate polymer and ethylene vinylalcohol during the polymerization of polylactic acid or to a polylactic acid to cause copolymerization.

The lactic acid-based polymer can be further polymerized by adding a molecular weight increasing agent such as polyvalent carboxylic acid and/or acid anhydride and polyvalent isocyanate at any step during polymerization. Preferred examples of the polyvalent carboxylic acid include trimellitic acid, and pyromellitic acid. Preferred examples of the acid anhydride include succinic anhydride, trimellitic anhydride, and pyromellitic anhydride.

Examples of the polyvalent isocyanate include 2,4-tolylene diisocyanate, mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate, isophorone diisocyanate, triphenylmethane-4,4',4"-triisocyanate. The added amount of the molecular weight increasing agent may be from 0.01 to 5% by weight based on the weight of the lactic acid-based polymer. In this arrangement, the weight-average molecular weight of the lactic acid-based polymer, which could ordinary be raised to about 300,000, can be raised to a range of from 600,000 to 700,000.

By adding a chelating agent and acidic phosphoric acid ester as a polymerization catalyst deactivator after the termination of the polymerization, the reverse reaction of polymerization reaction caused by residual catalyst at the thermoforming step, etc. can be prevented to inhibit the production of lactide or oligomer from the polymer, making it possible to enhance the heat stability and storage stability of the polymer.

Referring to the mechanism of enhancement of stability by the acidic phosphoric acid ester, the acidic phosphoric acid ester forms a complex with metallic ions in the catalyst contained in the composition comprising a polyester made of polyhydroxycarboxylic acid component, dicarboxylic acid component and diol component and a molecular weight increasing agent to deactivate the catalyst.

Examples of the chelating agent include organic chelating agents such as amino acid, phenol, hydroxycarboxylic acid, diketone, amine, oxim, phenanthroline, pyridine compound, dithio compound, phenol including coordinated atom N, carboxylic acid including coordinated atom N, diazo compound, thiol and porphyrin.

These chelating agents form a complex with metallic ions in the catalyst to deactivate the catalyst. An inorganic chelating agent must be handled with caution because it has a high hygroscopicity and, when moistened, loses its effect. Specific examples of such an inorganic chelating agent include phosphoric acids such as phosphoric acid, phosphorous acid, pyrophosphoric acid and polyphosphoric acid. These organic chelating agents and inorganic chelating agents may be used in admixture.

Examples of the acidic phosphoric acid ester include acidic phosphoric acid ester, phosphonic acid ester, alkylphosphonic acid, and mixture thereof. Among these acidic phosphoric acid esters, acidic phosphoric acid ester exerts a great effect of deactivating catalyst. The added amount of the catalyst deactivator depends on the kind of the catalyst deactivator used, the kind of the catalyst used, and the kneading conditions. In practice, however, it is preferably from 0.001 to 5 parts by weight based on the lactic acid-based polymer used or from 0.1 to 100 parts by weight based on 1 part by weight of the polymerization catalyst used.

The lactic acid-based polymer to be used in the present invention preferably has a residual monomer content of not more than 2% by weight, more preferably not more than 1% by weight, even more preferably not more than 0.1% by weight, at the initial stage of polymerization. By controlling the content of residual monomer, particularly residual lactide, in the lactic acid-based polymer used to a reduced value, the added amount of the degradation accelerator can be determined, making it possible to control the rate of degradation of the lactic acid-based polymer and the lactic acid-based polymer laminated product prepared therefrom.

The lactic acid-based polymer (B) constituting the barrier layer (II) for preventing the leakage of degradation accelerator needs to have a residual lactide content as small as not more than 0.1% by weight. In this arrangement, the leakage of the degradation accelerator from the base layer (I) made of the lactic acid-based polymer (A) containing the degradation accelerator can be inhibited, making it possible to prevent the deposition of the degradation accelerator on the chill roll or cooling mold during forming, i.e., extrusion film-forming, extrusion molding or injection molding and hence prevent the transfer of deposit marks to the molded product. Thus, the external appearance of the molded product can be kept good.

The elimination of the content of residual monomer and oligomer, which is effected rather than deactivation of the polymerization catalyst with a catalyst deactivator, can be accomplished by volatilization process involving heating and volatilization of the lactic acid-based polymer under reduced pressure. In some detail, volatilization can be effected using a single screw extruder, twin-screw extruder, film type evaporator, pot-decompression apparatus or the like. Volatilization is preferably effected under conditions such that the lactic acid-based polymer thus prepared can be continuously taken out while being heated (mostly melted) under reduced pressure.

In order to prevent the drop of the molecular weight of the lactic acid-based polymer, volatilization is preferably effected at a temperature of from 60° C. to 200° C. for seconds to 10 minutes or at a temperature of 100° C. to 230° C. and a pressure of from 0.1 to 50 Torr, more preferably from 0.1 to 10 Torr, even more preferably from 0.1 to 5 Torr. Alternatively, the lactic acid-based polymer thus prepared may be pelletized or ground, and then taken out while being heated under reduced pressure. In this case, too, volatilization is preferably effected at a temperature of from 60° C. to 200° C. and a pressure of from 0.1 to 50 Torr, more preferably from 0.1 to 10 Torr, even more preferably from 0.1 to 5 Torr, for 2 to 400 minutes to prevent the drop of the molecular weight of the lactic acid-based polymer.

Also by thermoforming the lactic acid-based polymer thus prepared and taken out into a film or sheet using a single or twin-screw extruder provided with a vent through which volatilization can be made, the residual monomer content can be reduced. In this case, too, volatilization is preferably effected at a temperature of from 145° C. to 230 ° C. and a pressure of from 0.1 to 50 Torr, more preferably from 0.1 to 10 Torr, even more preferably from 0.1 to 5 Torr, for 3 seconds to 5 minutes to prevent the drop of the molecular weight of the lactic acid-based polymer.

Further, a reprecipitation process may be employed which comprises dissolving the lactic acid-based polymer thus prepared in a solvent, and then adding the polymer solution to a poor solvent to obtain the desired lactic acid-based polymer. Examples of the solvent for dissolving the lactic acid-based polymer therein include benzene, toluene, ethylbenzene, xylene, cyclohexane, methyl ethyl ketone, methyl isobutyl ketone, tetrahydrofuran, dioxane, methyl isobutyl ketone, isopropyl ether, dichloromethane, chloroform, carbon tetrachloride, chlorobenzene, dichlorobenzene, trichlorobenzene, and chloronapthalene.

These solvents may be used singly or in admixture. Examples of the poor solvent employable herein include water, methanol, ethanol, propanol, butanol, pentane, octane, nonane, decane, diethyl ether, and mixture thereof.

The reprecipitation process comprises dissolving a lactic acid-based polymer in a solvent at room temperature or under heating to a concentration of from 2 to 20% by weight, gradually adding the solution to a 2 to 15-fold amount of a poor solvent with stirring, and then allowing the solution to stand for 10 to 180 minutes to produce a precipitate which is then taken out. The precipitate thus taken out is then freed of residual solvent under reduced pressure and/or under heating.

The reduction of the residual monomer and oligomer content can be accomplished by the foregoing process which comprises the use of a polymerization catalyst deactivator to prevent the occurrence of residual monomer and oligomer or the mechanical removal of residual monomer and oligomer such as volatilization process and reprecipitation process. Either of the two processes can reduce the content of residual monomer components in the lactic acid-based polymer. The two processes may be employed in combination.

The lactic acid-based polymer to be incorporated in the laminated product of the present invention may comprise as second and third components other polymers and known additives such as plasticizer, stabilizer, oxidation inhibitor, anti-blocking agent, anti-clouding agent and coloring agent incorporated therein as necessary so far as its properties cannot be impaired. Examples of these polymers employable herein include aliphatic polyester, polyvinyl alcohol, polyhydroxy butyrate hydroxy valerate, and starch-based polymer.

Examples of the additives employable herein include polyester-based plasticizers such as 1,3-butanediol and adipic acid, plasticizers such as dioctyl phthalate and polyethylene glycol adipic acid, stabilizers such as epoxidized soybean oil and carbodiimide, oxidation inhibitors such as 2,6-di-tertiary butyl-4-methylphenol (BHT) and butyl hydroxyanisole (BHA), anti-bloc:king agents such as silica and talc, anti-clouding agents such as glycerinaliphatic acid ester and citric acid monostearyl, and coloring agents such as titanium oxide, carbon black and ultramarine.

Examples of the degradation accelerator made of lactide and/or organic acid to be incorporated in the lactic acid-based polymer laminated product include organic acids besides lactides. Examples of these organic acids include hydroxy acids such as lactic acid, glyceric acid, tartaric acid and citric acid, monocarboxylic acids such as lauric acid, stearic acid and oleic acid, dicarboxylic acids such as succinic acid, adipic acid and sebacic acid, and aromatic carboxylic acids such as benzoic acid and phthalic acid. The lactide cleaves to form a lactic acid that accelerates the hydrolysis of the lactic acid-based polymer. On the other hand, the organic acid itself accelerates the hydrolysis of the lactic acid-based polymer. Thus, the degradation of the lactic acid-based polymer laminated product of the present invention can be accelerated.

In other words, the mechanism of degradation of a lactic acid-based polymer in the natural world consists of the following two possible stages. The first stage of degradation of the lactic acid-based polymer involves the hydrolysis of the lactic acid-based polymer. The hydrolysis of the lactic acid-based polymer then proceeds. When the molecular weight of the lactic acid-based polymer decreases, microorganism preys upon the polymer to initiate degradation. The degradation accelerator as used herein accelerates mostly the hydrolysis at the first stage. As a result, degradation is accelerated in the natural world.

Among these organic acids, those having a higher boiling or sublimation point than that of lactide which can hardly be leaked from the lactic acid-based polymer during thermoforming are preferably used from the standpoint of productivity of lactic acid-based polymer laminated product and controllability of degradation of lactic acid-based polymer laminated product. From the standpoint of handleability, the organic acid preferably stays normally solid. Preferred examples of these organic acids are set forth in Table 1 below.

TABLE 1

| Degradation accelerator compound | Boiling point (° C.) | Melting point (° C.) | Sublimation point (° C.) |
| --- | --- | --- | --- |
| Pyromellitic acid | — | 275 | — |
| Trimellitic acid | — | 238 | — |
| Trimellitic anhydride | — | 163 | — |
| Terephthalic acid | — | 425 | 300 |
| Benzoic acid | 250 | 121 | 100 |
| L-tartaric acid | Degraded | 168–170 | — |
| D-tartaric acid | Degraded | 168–170 | — |
| DL-tartaric acid | — | 206 | — |
| Citric acid | — | 100 | — |
| Benzilic acid | — | 150 | — |
| Lauric acid | 225 | 44 | — |
| Stearic acid | 287 | 70 | — |
| Oleic acid | 223 | 14 | — |
| Succinic acid | 235 | 185 | — |

TABLE 1-continued

| Degradation accelerator compound | Boiling point (° C.) | Melting point (° C.) | Sublimation point (° C.) |
| --- | --- | --- | --- |
| Adipic acid | 205 | 153 | — |
| Sebacic acid | 232 | 133 | — |
| DL-malic acid | 150 | 130–131 | — |

These organic acids may be used in any combination. The lactic acid-based polymer to be incorporated in the base layer (I) comprising the lactic acid-based polymer (A) constituting the lactic acid-based polymer laminated product of the present invention comprises these degradation accelerators made of lactide and/or organic acid incorporated therein in an amount of from 0.3 to 7% by weight, preferably from 0.5 to 5% by weight.

It is not preferred from the standpoint of storage stability of the lactic acid-based polymer to be used as starting material that these degradation accelerators be incorporated in the lactic acid-based polymer over an extended period of time before the production of the laminated product. It is thus preferred that these degradation accelerators be added to the lactic acid-based polymer constituting the base layer (I) during the preparation of the lactic acid-based polymer laminated product.

The preparation of the lactic acid-based polymer laminated product of the present invention can be accomplished by an ordinary process for the formation of general-purpose resin such as extrusion film-forming process, extrusion molding process and injection molding process. Any process which can prepare a structure comprising a laminate of base layer (I) and barrier layer (II) may be used without restriction.

In the lactic acid-based polymer laminated product of the present invention, the thickness ratio of the barrier layer (II) made of lactic acid-based polymer (B) is preferably from 0.02 to 1 based on that of the base layer (I).

If the thickness ratio of the barrier layer (II) is not more than 0.02, the resulting effect of preventing the leakage of the degradation accelerator from the base layer (I) is not sufficient, possibly causing troubles during thermoforming, storage and flow. It is not specially necessary that the upper limit of the barrier layer (II) be predetermined. In practice, however, if the thickness ratio of the barrier layer (II) is not less than 1, the degradation accelerator contained in the base layer (I) cannot sufficiently exert its effect of accelerating the degradation of the polymer. Thus, the barrier layer (II) cannot sufficiently accomplish its object of constituting the laminated product and accelerating the degradation of the polymer.

Referring to the extrusion molding of film or sheet, a process for the preparation of the lactic acid-based polymer laminated product will be described hereinafter. In general, a film is a relatively thin flat material which can be formed into a shopping bag or the like. A sheet is a flat material having a greater thickness than film which can be thermoformed by a vacuum forming machine into a lightweight vessel.

The lamination of the lactic acid-based polymer can be preferably accomplished by multi-layer extrusion film-forming process using two or more extruders. Alternatively, a process may be used which comprises extrusion-coating a film or sheet which has been previously formed as a lactide barrier layer (II) onto a base layer (I) during the extrusion film-forming of the film or sheet as base layer (I). Further, a process may be which comprises dry-laminating a lactide barrier layer (II) and a base layer (I) which have been previously formed with an adhesive provided interposed therebetween.

When carrying out co-extrusion film-forming process, extrusion coating process or dry lamination process, the barrier layer (II) may have been vacuum-coated with a metal or metal oxide and/or printed with patterns.

The extrusion film-forming of the film or sheet made of lactic acid-based polymer laminated product and its conditions will be described hereinafter. The lactic acid-based polymer has a high hygroscopicity and a high hydrolyzability and thus requires water content control. Thus, if subjected to extrusion film-forming using an ordinary single-screw extruder, the lactic acid-based polymer needs to be dehumidified and dried by a vacuum dryer or the like before forming.

Film forming by vent type twin-screw extruder exerts a high dehydration effect that can eliminate drying step, enabling efficient film forming. The temperature at which the lactic acid-based polymer is melt-extruded into a film or sheet depends on the melting point and softening point of the lactic acid-based polymer used and is not specifically limited. In practice, however, it is normally from 150° C. to 250° C., The film or sheet thus extruded is casted to a predetermined thickness, and then optionally cooled.

During this procedure, if the thickness of the film or sheet thus extruded is great, chill roll or air knife may be properly used to give a uniform film or sheet. If the thickness of the film or sheet thus extruded is small, electrostatic pinning may be used to give a uniform extrusion product. The die lip clearance through which melt extrusion is effected is from 0.2 to 3.0 mm, preferably from 0.2 to 1.5 mm taking into account the film-forming properties.

The lamination process will be described hereinafter. Referring first to the preparation of the lactic acid-based polymer laminated product by multi-layer extrusion film-forming process, a base layer (I) and a degradation accelerator barrier layer (II) are melt-kneaded by separate extruders, laminated on each other in a T-die or preceding feed block or the like, and then formed into a film or sheet through T-die. The extrusion film-forming process and its conditions are basically the same as previously mentioned.

During this procedure, the degradation accelerator is added. However, when moistened, a hygroscopic material such as lactide shows a rapid form change, i.e., from powdery to sherbet-like at ordinary temperature. Accordingly, it is preferred from the standpoint of handleability that such a degradation accelerator be added bone dry or in similar atmosphere such as atmosphere purged with nitrogen.

The addition of the degradation accelerator to the lactic acid-based polymer can be accomplished by blending with the lactic acid-based polymer before extrusion film-forming or by injecting into the hopper at the resin intake port of the extruder at a desired mixing ratio while being extruded using an apparatus capable of continuous blending such as auto feeder.

The extrusion coating involves contact-bonding and lamination of the barrier layer (II) which has been fed by a feeding mechanism and the base layer (I) which has been introduced into the laminator T-die from the extruder. The process for the extrusion film-forming of the base layer (II) and its conditions are basically the same as previously mentioned. If the barrier layer (II) and the base layer (I) have a poor adhesivity to each other, the barrier layer (II) may be subjected to chemical etching such as chrome treatment, surface treatment such as corona discharge treatment, flame plasma treatment, ozone and ultraviolet treatment or surface roughening such as sand-blast or provided with a proper anchor coating agent to enhance the adhesivity thereof.

The lactic acid-based polymer laminated product of sheet or film thus prepared may be subjected to stretching treatment for the purpose of enhancing the strength or production efficiency thereof. The stretching treatment is not specifically limited. In practice, however, the sheet obtained shortly after melt extrusion of the lactic acid-based polymer or which has been stored may be subjected to any of rolling, uniaxial longitudinal stretching, uniaxial crosswise stretching, simultaneous biaxial stretching and successive biaxial stretching.

The lactic acid-based polymer laminated product of the present invention may be subjected to evaporation treatment with a metal or metal oxide or printing treatment, if necessary. Further, it may be coated with a surfactant in order to antistatic property and anticlouding property. Examples of the surfactant include cationic, anionic and non-ionic surfactants, with non-ionic surfactants being preferred from the standpoint of hygienic property. Furthermore, in order to improve the handleability of the molded product, it may be coated with silicone or a silicone emulsion solution.

The film or sheet made of the lactic acid-based polymer laminated product of the present invention can be preferably used as an agricultural multi-purpose film or green house sheet which is required to degrade at various points of time depending on the period of growth of crops or civil engineering sheet which can be used for construction having various periods.

When the lactic acid-based polymer laminated product of the present invention is subjected to extrusion film-forming, no lactide is deposited on the chill roll, making it possible to prepare a film or sheet having a good external appearance.

Further, the lactic acid-based polymer laminated product thus prepared can be subjected to thermoforming such as vacuum forming, pressure forming, trapped sheet forming and deep draw vacuum forming to give a molded product, lightweight vessel, etc. for packaging contents such as food, beverage, chemical, miscellaneous goods, etc. with rigidity.

The term "packaging bag" as used herein is meant to indicate a commonly used bag in flat form, optionally steric form, obtained by bending or heat-fusing a synthetic resin film so that it is sealed to each other. The packaging bag thus prepared is adapted to package foods such as vegetable, confectionery and bread, miscellaneous goods, rice, fertilizer, etc.

Referring to injection molding, the process for the preparation of the lactic acid-based polymer laminated product will be described hereinafter.

Injection molding is a widely used forming process which allows continuous preparation of high precision products having a complicated shape in a short cycle. Formed products thus obtained find wide application in the art of automobile, electronic apparatus, electrical apparatus, business machine, construction material, daily necessaries, etc. During injection molding, the resin to be molded is injected into a sealed mold at a pressure as high as 50 to 200 MPa so that it is shaped.

Thus, in order to prevent the deposition of a degradation accelerator such as lactide on the surface of the mold, the base layer (I) made of the lactic acid-based polymer (A) containing a degradation accelerator is preferably coated with the barrier layer (II) made of the lactic acid-based polymer (B). The preparation of such a laminate can be appropriately accomplished by sandwich molding process. For sandwich molding process, the resin to be used as skin layer is injected into the mold in which it is shaped. Thereafter, the skin layer resin and the corelayer resin are simultaneously injected. Eventually, another skin layer resin is injected to terminate the filling with resin.

In this case, the base layer (I) made of the lactic acid-based polymer (A) acts as a core layer in the sandwich molding process. On the other hand, the barrier layer (II) made of the lactic acid-based polymer (B) acts as a skin layer. The temperature at which the lactic acid-based polymer is melted during injection molding depends on the kind of the lactic acid-based polymer used and thus is not specifically limited. In practice, however, it is normally from 150° C. to 300° C. Besides sandwich molding process, multi-color molding may be used involving successive injection of resin into the mold using a plurality of injection apparatus. The injection molding of the lactic acid-based polymer laminated product of the present invention can be accomplished by any known molding process. The present invention is not specifically limited to these molding processes.

Referring to blow molding, the process for the preparation of the lactic acid-based polymer laminated product will be described hereinafter. As a vessel for liquid such as beverage, chemical and toilet lotion there is used glass bottle or bottle obtained by forming a synthetic resin. In particular, a synthetic resin bottle vessel prepared by blow molding has a lightweight and excellent characteristics such as high transparency, high water resistance, high strength, good theemoformability and low cost and thus has been widely spread.

Blow molding comprises extrusion molding or injection-molding a thermoplastic synthetic resin into a tubular preform called parison, and then blowing air into the parison disposed interposed between a pair of blow molds so that it is inflated, cooled and solidified to prepare a vessel. For the preparation of a bottle vessel made of the lactic acid-based polymer laminated product of the present invention, multi-layer stretch-blow molding process, which is widely spread, can be best applied.

In order to use this process to prepare the lactic acid-based polymer laminated product, a preform made of the lactic acid-based polymer laminated product of the present invention is prepared by an injection molding process called co-injection utilizing the sandwich molding process as mentioned above with reference to injection molding process. In this case, too, the base layer (I) made of the lactic acid-based polymer (A) acts as a core layer while the barrier layer (II) made of the lactic acid-based polymer (B) for preventing the leakage of the degradation accelerator acts as a skin layer.

The preform thus prepared is then inflated in the mold for shaping into a bottle vessel to give a product. The inflation of the parison can be preferably accomplished by a cold parison process involving reheating of the parison before inflation. This cold parison process can provide a product having a great wall thickness and a good uniformity in weight and thickness. Further, this cold parison process allows parison molding and blow molding at separate steps, making it possible to continuously mold parisons. Moreover, the retention time of resin in the injection molding machine can be reduced, making it possible to mold a thermally decomposable resin.

The temperature at which the lactic acid-based polymer is melt-molded into a parison during injection molding is not specifically limited but is normally from 150° C. to 300° C. Subsequently, the parison thus prepared is subjected to blow molding in a mold. If necessary, blow air may be renewed by air circulation to inhibit heat shrinkage due to the effect of the temperature of the blow mold for shaping. As occasion may be, the opening of the parison may be heated before blow molding so that it is crystallized to enhance the heat stability thereof, preventing the leakage of blow air from the opening and hence assuring blow molding.

The factor of inflation by blow molding is preferably from 1.4 to 16, more preferably from 2 to 15 as calculated in terms of B/A (blow ratio) where A is the size (length×width) of the parison portion to be inflated and B is the size (length×width) of the vessel obtained by blow molding from the standpoint of the external appearance and shape of the vessel. The parison temperature at which blow molding is effected is preferably from the glass transition temperature of the lactic acid-based polymer to not higher than the crystallization temperature of the lactic acid-based polymer to eventually keep the shape and transparency of the vessel good.

If the parison temperature falls below the glass transition temperature of the lactic acid-based polymer used, the parison cannot be uniformly inflated during blow molding, making it impossible to provide a vessel having a good shape. On the contrary, if the parison temperature exceeds the crystallization temperature of the lactic acid-based polymer, the resulting vessel is clouded. In addition, the parison cannot be uniformly inflated, making it possible to provide a vessel having a good shape.

The blow molding of the lactic acid-based polymer may be accomplished by other molding processes so far as the desired lactic acid-based polymer laminated product of the present invention can be prepared. For example, extrusion blow process comprises extruding into a tubular parison, and then inflating the parison into a vessel. Injection-extrusion blow process comprises injection-molding a part of parison constituting the neck of a vessel, cooling the parison, extrusion molding the body portion of the parison, and then inflating the parison. Sheet blow molding process comprises extruding the lactic acid-based polymer through a slit die into a sheet.

The vessel made of lactic acid-based polymer thus obtained can be used as a vessel for liquid such as beverage, chemical, cosmetic liquid, etc. In the foregoing injection molding or blow molding process, too, the lactic acid-based polymer requires water content control because it has a high hygroscipicity and a high hydrolyzability. Thus, if the polymer is subjected to injection molding or extrusion molding using an ordinary uniaxial extruder, it is preferred that the polymer be dehumidified and dried by means of a vacuum drier or dehumidifier/drier before molding.

The terms "glass transition temperature", "crystallization temperature" and "melting point" as used herein are meant to indicate $T_{ig}$, $T_{pc}$, and $T_{pm}$ defined in JIS-K-7121, respectively. As the degradability test there was effected an environmental load test using a Type UVCON weathering resistance test machine produced by ATLAS Corp. The comparison of the results of the environmental load test using a Type UVCON weathering resistance test machine with the results of biodegrading test in soil gives a consideration that the results of the biodegrading test in soil vary with the soil conditions. The molecular weight half period of a polylactic acid free of degradation accelerator and having a residual lactide content of 0% is about 3 years underground but is 23 days in the environmental load test using UVCON.

The degree of degradation of a polymer can be determined by measuring the molecular weight drop by GPC method. In the present invention, the period of time required until the molecular weight of the lactic acid-based polymer is halved from before the environmental load test, i.e., half period was determined to give a measure of the degradation rate. A polymer having a short half period is suitable for film or sheet, molded product such as packaging bag or lightweight vessel obtained by forming these films or sheets or molded product called one-way which is used for a short period of time and then discarded such as injection-molded vessel and blow-molded vessel.

The lactic acid-based polymer laminated product of sheet or film obtained according to the present invention may comprise a degradation accelerator such as lactide incorporated therein to give a packaging material having an accelerated biodegradability and a good therformability for agricultural or civil engineering use or for use with various foods, beverages, chemicals, miscellaneous goods, etc. or thermoformed product, packaging bag or lightweight vessel.

The present invention will be further described in the following examples, but the present invention should not be construed as being limited thereto. Examples of the process for the preparation of the lactic acid-based polymer used herein will be described below.
(Degradability test method)

The half period required until the weight-average molecular weight of the molded products obtained in the examples is halved from before exposure test was confirmed by an exposure test using a Type UVCON weathering resistance test machine produced by ATLAS Corp.

For the measurement of molecular weight, GPC produced by TOSOH CORP. was used. The test using UVCON was effected at an ultraviolet cycle temperature of 60° C. and a temperature for the wet cycle of 40° C. These cycles were each repeated every 4 hours.

REFERENCE EXAMPLE 1

Preparation of Lactic Acid-Based Polymer P1

To 5 parts by weight of an aliphatic polyester (weight-average molecular weight: 24,000 (polystyrene equivalence); sebacic acid: 50 mol-%; propylene glycol: 50 mol-%) were added 95 parts by weight of a lactide (L-lactide: 99 mol-%; D-lactide: 1 mol-%). In an atmosphere in which the air within had been replaced by an inert gas, the mixture was then stirred at a temperature of 170° C. for 1 hour. The mixture was then allowed to undergo polymerization reaction in the presence of tin octanoate as an esterification catalyst in an amount of 0.02 part by weight for 8 hours.

After the termination of polymerization reaction, to the reaction material was added an acidic phosphoric acid ester as a deactivator in an amount of 0.04 part by weight. The reaction product was subjected to volatilization at an elevated temperature under reduced pressure using a single-screw extruder. The volatilization was effected at a temperature of 200° C. and a pressure of 5 Torr for 120 seconds. The lactic acid-based polymer thus obtained was a colorless transparent resin. The weight-average molecular weight of the lactic acid-based polymer was 203,000 as determined by GPC. The content of residual monomers such as lactide was 0%. The lactic acid-based polymer showed a glass transition temperature (Tg) of 55° C., a crystallization temperature (Tc) of 108° C. and a melting point (Tm) of 168° C. The lactic acid-based polymer thus prepared will be hereinafter referred to as "P1".

REFERENCE EXAMPLE 2

Preparation of Lactic Acid-Based Polymer P2

In an inert gas atmosphere, L-lactide was stirred at a temperature of 185° C. for 1 hour, and then allowed to undergo polymerization reaction in the presence of tin octanoate as an esterification catalyst in an amount of 0.02 part by weight for 8 hours. Thereafter, the reaction product was kneaded with 0.04 part by weight of an acidic phosphoric acid ester as a deactivator. The reaction product was then subjected to volatilization at an elevated temperature under reduced pressure using a single-screw extruder. The volatilization was effected at a temperature of 200° C. and a pressure of 5 Torr for 120 seconds. The polylactic acid thus obtained was a colorless transparent resin. The weight-average molecular weight of the polylactic acid was 252,000 as determined by GPC. The content of residual monomers such as lactide was 0%. The polylactic acid showed a glass transition temperature (Tg) of 59° C., a crystallization temperature (Tc) of 110° C. and a melting point (Tm) of 176° C. The polylactic acid thus prepared will be hereinafter referred to as "P2".

REFERENCE EXAMPLE 3

Preparation of Lactic Acid-Based Polymer P3

To 20 parts by weight of an aliphatic polyester (weight-average molecular weight; 35,000 (polystyrene equivalence); sebacic acid: 50 mol-%; 1,6-hexanediol: 50 mol-%) were added 80 parts by weight of a lactide (L-lactide: 97 mol-%; D-lactide: 3 mol-%). In an atmosphere in which the air within had been replaced by an inert gas, the mixture was then stirred at a temperature of 170° C. for 1 hour. The mixture was then allowed to undergo polymerization reaction in the presence of tin octanoate as an esterification catalyst in an amount of 0.02 part by weight for 8 hours. After the termination of polymerization reaction, to the reaction material was added an acidic phosphoric acid ester as a deactivator in an amount of 0.04 part by weight. The reaction product was subjected to volatilization at an elevated temperature under reduced pressure using a single-screw extruder. The volatilization was effected at a temperature of 200° C. and a pressure of 5 Torr for 120 seconds. The lactic acid-based polymer thus obtained was a colorless transparent resin. The content of residual monomers such as lactide was 0% as determined by GPC. The lactic acid-based polymer showed a weight-average molecular weight of 113,000, a glass transition temperature (Tg) of 49° C., a crystallization temperature (Tc:) of 93° C. and a melting point (Tm) of 162° C. The lactic acid-based polymer thus prepared will be hereinafter referred to as "P3".

REFERENCE EXAMPLE 4

Preparation of Lactic Acid-Based Polymer P4

To 40 parts by weight of an aliphatic polyester (weight-average molecular weight: 34,000 (polystyrene equivalence); sebacic acid: 50 mol-%; ethylene glycol: 25 mol-%; 1,6-hexanediol: 25 mol-%) were added 60 parts by weight of a lactide (L-lactide: 97 mol-%; D-lactide: 3 mol-%). In an atmosphere in which the air within had been replaced by an inert gas, the mixture was then stirred at a temperature of 165° C. for 1 hour. The mixture was then allowed to undergo polymerization reaction in the presence of tin octanoate as an esterification catalyst in an amount of 0.02 part by weight for 8 hours. Thereafter, to the reaction material was added an acidic phosphoric acid ester as a deactivator in an amount of 0.04 part by weight. The reaction mixture was then kneaded.

After the termination of the reaction, the reaction product was subjected to reprecipitation with tetrahydrofuran as a solvent and methanol as a poor solvent. The lactic acid-based polymer thus obtained was a colorless transparent resin having a weight-average molecular weight of 102,000 as determined by GPC. The polymer had a residue (lactide, etc.) content of 0% (below the measurable limit). The lactic acid-based polymer showed a glass transition temperature (Tg) of 51° C., a crystallization temperature (Tc) of 73° C. and a melting point (Tm) of 162° C. The lactic acid-based polymer thus obtained will be hereinafter referred to as "P4". The glass transition temperature (Tg), crystallization temperature (Tc) and melting point (Tm) as used herein are $T_{ig}$, $TP_{pc}$, and $T_{pm}$ defined in JIS-K-7121, respectively. The rate of temperature rising was 10° C./min.

EXAMPLES 1 TO 10

Lactic acid-based polymers set forth in Tables 2 and 3 were subjected to multi-layer extrusion film-forming to form a three-layer laminate having a thickness of 100 μm consisting of two components using a multi-layer extrusion system produced by Tanabe Plastic Machinery Co., Ltd. In some detail, the lactic acid-based polymer (A) comprised L-lactide incorporated therein as a degradation accelerator in an amount such that the value set forth in the tables was reached during extrusion. On the other hand, the lactic acid-based polymer (B) comprised a lactide incorporated therein in an amount such that the value set forth in the tables was reached during extrusion. During this procedure, how the lactide was attached to the chill roll and the external appearance of the resulting lactic acid-based polymer laminated product sheet (molded product) were then observed.

The lactide barrier layer and base layer are set forth in Tables 2 and 3. The attachment of lactide or degradation accelerator to the chill roll from these extrusion products was visually confirmed. The symbol ○ in the table indicates that no lactide or degradation accelerator is attached, providing good molding. The symbol X indicates that attachment or deposition occurs, providing undesirable molding. For the evaluation of external appearance of molded product, the symbol ○ indicates that the molded product has a smooth surface and a good external appearance. The symbol X indicates that the molded product has an explicitly marred external appearance. The results of measurements of molecular weight half period concerning the acceleration and control of degradation are set forth in Tables 2 and 3.

TABLE 2

| Example No. | 1 | 2 | 3 | 4 | 5 | 6 |
|---|---|---|---|---|---|---|
| Barrier layer | | | | | | |
| Lactic acid-based polymer (B) | P1 | P1 | P1 | P1 | P1 | P1 |
| % Lactide content | 0 | 0 | 0 | 0 | 0 | 0 |
| Base layer | | | | | | |
| Lactic acid-based polymer (A) | P1 | P1 | P1 | P1 | P1 | P2 |
| % Degradation accelerator content | 0.3 | 1 | 3 | 7 | 7 | 0.3 |
| Thickness ratio of barrier layer/base layer | 0.02 | 0.06 | 0.20 | 0.50 | 0.10 | 0.02 |

TABLE 2-continued

| Example No. | 1 | 2 | 3 | 4 | 5 | 6 |
|---|---|---|---|---|---|---|
| Film thickness ($\mu$m) | 100 | 100 | 100 | 100 | 100 | 100 |
| Attachment of lactide to chill roll | ○ | ○ | ○ | ○ | ○ | ○ |
| External appearance of molded product | ○ | ○ | ○ | ○ | ○ | ○ |
| Molecular weight half period (day) | 17 | 16 | 8 | 6 | 7 | 17 |

TABLE 3

| Example No. | 7 | 8 | 9 | 10 |
|---|---|---|---|---|
| Barrier layer Lactic acid-based polymer (B) | P1 | P1 | P2 | P3 |
| % Lactide content | 0 | 0 | 0 | 0.1 |
| Base layer Lactic acid-based polymer (A) | P3 | P4 | P1 | P1 |
| % Degradation accelerator content | 1 | 3 | 7 | 7 |
| Thickness ratio of barrier layer/base layer | 0.06 | 0.20 | 0.50 | 0.50 |
| Film thickness ($\mu$m) | 100 | 100 | 100 | 100 |
| Attachment of lactide to chill roll | ○ | ○ | ○ | |
| External appearance of molded product | ○ | ○ | ○ | ○ |
| Molecular weight half period (day) | 16 | 7 | 6 | 6 |

EXAMPLES 11 TO 13

Lactic acid-based polymers set forth in Table 4 were subjected to multi-layer extrusion film-forming to form a three-layer laminate having a thickness of 100 $\mu$m consisting of two components using a multi-layer extrusion system produced by Tanabe Plastic Machinery Co., Ltd. In some detail r the lactic acid-based polymer (A) comprised stearic acid for Example 11, adipic acid for Example 12 and terephthalic acid for Example 13 incorporated therein as a degradation accelerator in an amount such that the value set forth in the table was reached during extrusion. On the other hand, the lactic acid-based polymer (B) comprised a lactide incorporated therein in an amount such that the value set forth in the table was reached during extrusion. During this procedure, how the lactide was attached to the chill roll and the external appearance of the resulting lactic acid-based polymer laminated product sheet (molded product) were then observed. The barrier layer and base layer are set forth in Table 4. As a result, there was confirmed no attachment of degradation accelerator to the chill roll from these molded products. Thus, the external appearance of these molded products was good. The results of measurements of molecular weight half period concerning the acceleration and control of degradation are set forth in Table 4.

TABLE 4

| Example No. | 11 | 12 | 13 |
|---|---|---|---|
| Barrier layer Lactic acid-based polymer (B) | P1 | P1 | P2 |
| % Lactide content | 0 | 0 | 0 |
| Base layer Lactic acid-based polymer (A) | P3 | P4 | P1 |
| % Degradation accelerator content | 0.5 | 2.0 | 5.0 |
| Thickness ratio of barrier layer/base layer | 0.03 | 0.13 | 0.35 |
| Film thickness ($\mu$m) | 100 | 100 | 100 |
| Attachment of lactide to chill roll | ○ | ○ | ○ |
| External appearance of molded product | ○ | ○ | ○ |
| Molecular weight half period (day) | 7 | 12 | 7 |

EXAMPLE 14

Lactic acid-based polymers set forth in Table 5 were subjected to multi-layer extrusion film-forming to form a two-layer laminate having a thickness of 100 $\mu$m consisting of two components using a multi-layer extrusion system with air knife produced by Tanabe Plastic Machinery Co., Ltd. In some detail, the lactic acid-based polymer (A) comprised L-lactide incorporated therein as a degradation accelerator in an amount such that the value set forth in the table was reached during extrusion. On the other hand, the lactic acid-based polymer (B) comprised a lactide incorporated therein in an amount such that the value set forth in the table was reached during extrusion. During this procedure, how the lactide was attached to the chill roll and the external appearance of the resulting lactic acid-based polymer laminate product sheet (molded product) were then observed. During this procedure, the barrier layer made of the lactic acid-based polymer (B) was disposed on the chill roll side. The lactide barrier layer and base layer are set forth in Table 5. As a result, there was confirmed no attachment of lactide to the chill roll from these molded products, Thus, the external appearance of these molded products was good. The results are set forth in Table 5,

EXAMPLE 15

Preparation of Packaging Bag

Lactic acid-based polymers set forth in Table 5 were subjected to multi-layer extrusion film-forming to form a three-layer laminate having a thickness of 35 $\mu$m consisting of two components using a multi-layer extrusion system produced by Tanabe Plastic Machinery Co., Ltd. In some detail, the lactic acid-based polymer (A) comprised L-lactide incorporated therein as a degradation accelerator in an amount such that the value set forth in the table was reached during extrusion. On the other hand, the lactic acid-based polymer (B) comprised a residual lactide incorporated therein in an amount such that the value set forth in the table was reached during extrusion. During this procedure, how the lactide was attached to the chill roll and the external appearance of the resulting lactic acid-based polymer laminated product sheet (molded product) were then observed. The lactide barrier layer and base layer are set forth in Table 5. As a result, there was confirmed no attachment of lactide to the chill roll from these molded products. Thus, the external appearance of these molded products was good.

The laminated film thus obtained was then folded at one edge thereof to form the bottom of a packaging bag. The laminated film was then sealed at the both sides of the folded part thereof by means of a heat sealer produced by Tester Sangyo Co., Ltd. to prepare a 20 cm square packaging bag with one side open. The packaging bag thus prepared had a good external appearance. The two sides thus sealed had a good seal strength. (Sealing conditions: seal bar temperature: 90° C.; sealing pressure: 2 kgf/cm$^2$; sealing time: 1 sec. (size of seal bar used: 10×300 mm). The laminated film having a thickness of 35 μm was then examined for half period in the same manner as in Examples 1 to 10. The results are set forth in Table 5.

EXAMPLE 16

Preparation of Vacuum-Formed Product

Lactic acid-based polymers set forth in Table 5 were subjected to multi-layer extrusion film-forming to form a three-layer laminate having a thickness of 200 μm consisting of two components using a multi-layer extrusion system produced by Plastic Machinery Co., Ltd. In some detail, the lactic acid-based polymer (A) comprised L-lactide incorporated therein as a degradation accelerator in an amount such that the value set forth in the table was reached during extrusion. On the other hand, the lactic acid-based polymer (B) comprised a lactide incorporated therein in an amount such that the value set forth in the table was reached during extrusion. During this procedure, how the lactide was attached to the chill roll and the external appearance of the resulting lactic acid-based polymer laminated product sheet (molded product) were then observed. The lactide barrier layer and base layer are set forth in Table 5. As a result, there was confirmed no attachment of lactide to the chill roll from these molded products. Thus, the external appearance of the molded product was good.

The laminated sheet having a thickness of 200 μm thus obtained was then examined for half period in the same manner as in Examples 1 to 10. The results are set forth in Table 5. The sheet thus prepared was then subjected to vacuum forming in a mold having a draw ratio of 0.2 (female mold) to form a lightweight vessel. As a result, there was confirmed no attachment of lactide to the shaping mold. Thus, the external appearance and transparency of the molded vessel were good.

Vacuum forming conditions:

Heater temperature: 400° C.

Heating time: 10 sec.

Mold temperature: 80° C.

Molding time: 30 sec.

EXAMPLE 17

Preparation of Injection-Molded Product

Lactic acid-based polymers set forth in Table 5 were subjected to sandwich molding to form a box-shaped vessel having a capacity of 30 cm$^3$. In some detail, the lactide content in the barrier layer (skin layer) made of the lactic acid-bas ed polymer (B) was adjusted so as to reach the value set forth in Table 5 after injection molding. Further, the L-lactide content in the base layer (core layer) made of the lactic acid-based polymer (A) was adjusted so as to reach the value set forth in Table 5 after injection molding. The barrier layer/base layer thickness ratio averaged over various points was 0.1. The injection temperature was from 250° C. to 270° C. During the preparation of vessel, no lactide was attached to the mold. Thus, the external appearance of the vessel was good. The material thus injection-molded was then partly cut at the flat portion thereof. The specimen was then examined for half period in the same manner as in Examples 1 to 10. The results are set forth in Table 5.

EXAMPLE 18

Preparation of Stretch Blow-Molded Product

Lactic acid-based polymers set forth in Table 5 were subjected to co-injection molding to form a parison for 500 ml bottle. In some detail, the content of lactide in the lactide barrier layer (skin layer) made of the lactic acid-based polymer (B) was adjusted so as to reach the value set forth in Table 5 after injection molding. Further, the content of lactide (degradation accelerator) in the base layer (core layer) made of the lactic acid-based polymer (A) was adjusted so as to reach the value set forth in Table 5 after injection molding. The barrier layer/base layer thickness ratio averaged over various points was 0.1.

During this procedure, the injection temperature was from 250° C. to 270° C. The parison thus injection-molded was then formed into a vessel for liquid generally called bottle by means of a stretch blow molding machine while being uniformly heated by a far infrared ray heater, The blow ratio was 6. The blow pressure was 10 kg/cm$^2$. During the blow molding process, the parison temperature was 80° C., the mold temperature was 80° C., and the blow time was 30 seconds. For the measurement of the parison temperature, a thermograph was used. During both injection molding and stretch blow molding for the preparation of bottle, there was confirmed no attachment of lactide to the mold. Thus, the molded product had a good external appearance.

The bottle thus prepared was then partly cut. The specimen was then examined for half period in the same manner as in Examples 1 to 10. The results are set forth in Table 5.

TABLE 5

| Example No. | 14 | 15 | 16 | 17 | 18 |
| --- | --- | --- | --- | --- | --- |
| Barrier layer Lactic acid-based polymer (B) | P1 | P1 | P1 | P1 | P1 |
| % Lactide content | 0 | 0 | 0 | 0 | 0 |
| Base layer Lactic acid-based polymer (A) | P2 | P3 | P2 | P4 | P3 |
| % Degradation accelerator content | 0.3 | 1 | 1 | 1 | 3 |
| Thickness ratio of barrier layer/base layer | 0.02 | 0.06 | 0.1 | 0.1 | 0.2 |
| Attachment of lactide to chill roll | ○ | ○ | ○ | ○ | ○ |
| External appearance of molded product | ○ | ○ | ○ | ○ | ○ |
| Molecular weight half period (day) | 16 | 7 | 18 | 16 | 6 |

COMPARATIVE EXAMPLES 1 TO 3

Lactic acid-based polymers set forth in Table 6 were subjected to extrusion molding using an extruder produced by Tanabe Plastic Machinery Co., Ltd. with L-lactide being added thereto as a degradation accelerator in an amount set forth in Table 6. During this procedure, how the lactide was attached to the chill roll was observed. The results are set forth in Table 6. In Comparative Examples 1 to 3, lactide was attached to the chill roll, clouding the surface of the molded products and hence marring the external appearance thereof. Further, the molded products had a sticky surface.

COMPARATIVE EXAMPLES 4 AND 5

Lactic acid-based polymers set forth in Table 7 were subjected to multi-layer extrusion film-forming to form a three-layer laminate having a thickness of 100 μm consisting of two components using a multi-layer extrusion system produced by Plastic Machinery Co., Ltd. In some detail, the lactic acid-based polymer (A) comprised L-lactide incorporated therein as a degradation accelerator in an amount such that the value set forth in the table was reached during extrusion. On the other hand, the lactic acid-based polymer (B) comprised a residual monomer such as lactide incorporated therein in an amount such that the value set forth in the table was reached during extrusion. During this procedure, how the lactide was attached to the chill roll was then observed. The results are set forth in Table 7. The thickness ratio of barrier layer/base layer is set forth in Table 7.

The laminated film having a thickness of 100 μm was then examined for half period in the same manner as in Examples 1 to 10. The results are set forth in Table 7. Comparative Example 4 showed a half period similar to Comparative Example 6. Comparative Example 5 showed a shorter half period than Comparative Example 6. However, Comparative Example 5 showed a remarkable corrugated defect on the surface of the lactic acid-based polymer laminated film product during the lamination of the barrier layer and the base layer by the multi-layer extrusion system probably due to the difference in thermal fluidity between the two components. Thus, the resulting film had a marred external appearance.

TABLE 6

| Comparative Example No. | 1 | 2 | 3 |
|---|---|---|---|
| Lactic acid-based polymer (A) | P1 | P1 | P1 |
| % Degradation accelerator content | 0.5 | 3 | 7 |
| Film thickness (μm) | 100 | 100 | 100 |
| Attachment of lactide to chill roll | X | X | X |
| External appearance of molded product | X | X | X |
| Molecular weight half period (day) | 17 | 7 | 4 |

TABLE 7

| Example No. | 4 | 5 |
|---|---|---|
| Barrier layer Lactic acid-based polymer (B) | P1 | P1 |
| % Lactide content | 0 | 0 |
| Base layer Lactic acid-based polymer (A) | P1 | P1 |
| % Degradation accelerator content | 0.2 | 10 |
| Thickness ratio of barrier layer/base layer | 0.02 | 1 |
| Film thickness (μm) | 100 | 100 |
| Attachment of lactide to chill roll | ◯ | ◯ |
| External appearance of molded product | ◯ | X |
| Molecular weight half period (day) | 21 | 7 |

COMPARATIVE EXAMPLE 6

Lactic acid-based polymers set forth in Table 7 were subjected to extrusion film-forming to form a 100 μm thick sheet using an extruder produced by Tanabe Plastic Machinery Co., Ltd. The content of lactide in the sheet thus formed is set forth in Table 7. During this procedure, how the lactide was attached to the chill roll was observed, The results are set forth in Table 7. For the evaluation of degradability, the 100 μm thick sheet was examined for half period in the same manner as in Examples 1 to 10. The results are set forth in Table 7.

TABLE 7

| Comparative Example No. | 6 |
|---|---|
| Lactic acid-based polymer (A) | P2 |
| % Degradation accelerator content | 0 |
| Film thickness (μm) | 100 |
| Attachment of lactide to chill roll | ◯ |
| Molecular weight half period (day) | 23 |

These results show that a film or molded product made of the laminated product of the present invention is not liable to attachment or deposition on the machine during forming, shows a shorter half period than a film made of a lactic acid-based polymer free of degradation accelerator and shows a half period differing with the amount of degradation accelerator to be incorporated in the base layer and thus can be accelerated or controlled in degradation.

In accordance with the present invention, the use of a lactic acid-based polymer laminated product which is little liable to leakage of lactide during forming or storage of the formed product and can degrade at a raised rate and a molded product made of such a laminated product makes it possible to provide a laminated product of a lactic acid-based polymer having an accelerated or controlled biodegradability which can be used as film or sheet for agricultural or civil engineering purposes or can be used to package or house various foods, beverages, chemicals, miscellaneous goods, etc. and a molded product made of such a laminated product, particularly in the form of film, sheet, packaging bag or lightweight vessel obtained by thermoforming these films or sheets, injection-molded vessel, blow-molded vessel, etc.

While the invention has been described in detail and with reference to specific embodiments thereof, it will be apparent to one skilled in the art that various changes and modifications can be made therein without departing from the spirit and scope thereof.

What is claimed is:

1. A lactic acid-based polymer laminated product comprising a degradation accelerator barrier layer (II) made of a lactic acid-based polymer (B) having a lactide content of not more than 0.1% by weight laminated on one or both surfaces of a base layer (I) made of a lactic acid-based polymer (A) comprising a degradation accelerator made of lactide and/or organic acid in an amount of from 0.3 to 7% by weight, wherein the ratio of the barrier layer thickness to the base layer thickness is from 0.02 to 1 based on that of said base layer.

2. The lactic acid-based polymer laminated product according to claim 1, wherein said lactic acid-based polymer (A) and/or lactic acid-based polymer (B) comprises a polyester structural unit obtained by the dehydrocondensation of dicarboxylic acid with diol and/or a polyether structural unit obtained by the dehydrocondensation of dicarboxylic acid with a polyether polyol in an amount of from 3 to 60% by weight.

3. The lactic acid-based polymer laminated product according to claim 2, wherein said lactic acid-based polymer (B) comprises a lactic acid-based polymer containing a polymerization catalyst which has been deactivated with a polymerization catalyst deactivator after polymerization and/or the residual monomer content of which has been reduced by volatilization and/or reprecipitation.

4. The lactic acid-based polymer laminated product according to claim 2, wherein said lactic acid-based polymer (A) is one obtained by incorporating a degradation accelerator made of lactide and/or organic acid in a lactic acid-based polymer during its molding.

5. The lactic acid-based polymer laminated product according to claim 1, wherein said lactic acid-based polymer (A) and/or lactic acid-based polymer (B) is a polylactic acid.

6. The lactic acid-based polymer laminated product according to claim 5, wherein said lactic acid-based polymer (B) comprises a lactic acid-based polymer containing a polymerization catalyst which has been deactivated with a polymerization catalyst deactivator after polymerization and/or the residual monomer content of which has been reduced by volatilization and/or reprecipitation.

7. The lactic acid-based polymer laminated product according to claim 5, wherein said lactic acid-based polymer (A) is one obtained by incorporating a degradation accelerator made of lactide and/or organic acid in a lactic acid-based polymer during its molding.

8. The lactic acid-based polymer laminated product according to claim 1, wherein said lactic acid-based polymer (B) comprises a lactic acid-based polymer containing a polymerization catalyst which has been deactivated with a polymerization catalyst deactivator after polymerization and/or the residual monomer content of which has been reduced by volatilization and/or reprecipitation.

9. The lactic acid-based polymer laminated product according to claim 1, wherein said lactic acid-based polymer (A) is one obtained by incorporating a degradation accelerator made of lactide and/or organic acid in a lactic acid-based polymer during its molding.

10. A molded product of a lactic acid-based polymer laminated product according to any one of claims 1 to 7.

11. The molded product according to claim 10, which is in the form of film or sheet.

12. The molded product according to claim 11, obtained by injection molding or blow molding.

* * * * *